Patented Feb. 5, 1952

2,584,129

UNITED STATES PATENT OFFICE 2,584,129

PRODUCTION OF L-XYLOSE

Robert C. Hockett, Larchmont, N. Y., assignor to Heinz M. Wuest, Montclair, N. J.

No Drawing. Application February 15, 1950, Serial No. 144,377

5 Claims. (Cl. 260—209)

This invention relates to an improved process for the production of L-xylose, a compound useful in the production of ascorbic acid.

Several schemes have been suggested for the synthesis of ascorbic acid by isomerization and lactonization of either 2- or 3-keto hexonic acid. The 2-keto hexonic acid may be obtained by oxidation of either L-idonic or L-gulonic acid, which are both derivable from L-xylose by addition of hydrogen cyanide followed by hydrolysis. The 3-keto hexonic acid is normally obtained by addition of hydrogen cyanide to L-xylosone, followed by hydrolysis; the L-xylosone, in turn, may readily be obtained from L-xylose by oxidation. Accordingly, if L-xylose could be economically produced from readily available raw materials, commercially satisfactory syntheses of ascorbic acid would be available.

L-xylose has previously been synthesized from D-sorbitol by reacting the sorbitol with paraldehyde or benzaldehyde to produce condensation products in which appropriate groups are effectively protected, and then subjecting the condensation product to oxidation to form aldehyde condensation products of L-xylose; the L-xylose is then liberated by hydrolysis. However, neither paraldehyde nor benzaldehyde has been satisfactory for this purpose since the incidence of side reactions and by-products reduces the yield of protected sorbitol suitable for oxidation to uneconomic levels. Furthermore, the physical properties to the condensation products obtained in many instances preclude effective handling thereof.

It is the object of this invention to provide a process whereby L-xylose may be obtained in excellent yields from D-sorbitol.

In accordance with this invention, L-xylose is produced from D-sorbitol by a process which involves reaction of the D-sorbitol with furfural to form monofurfurylidene sorbitol and oxidation of the monofurfurylidene sorbitol, preferably with lead tetra acetate, whereby monofurfurylidene L-xylose is produced, from which L-xylose may be obtained by simple hydrolysis. I have surprisingly found that reaction of furfural with D-sorbitol may be controlled, as hereinafter specified, to give a readily recoverable monofurfurylidene sorbitol product which may be oxidized without further purification to give highly pure, crystalline L-xylose in yields of 80%–90% of theoretical, based on sorbitol. The clean character and high yields obtained in my process render it highly suitable for the synthesis of L-xylose, and, therefrom, ascorbic acid. The superiority of my process over processes using other aldehydes is particularly apparent.

In order to achieve the desirable results of my invention, it is essential that the reaction of the furfural and D-sorbitol be carefully controlled. Furfural is extremely sensitive to acids and hence it was not to be expected that this reagent could be reacted with D-sorbitol in the acid media required and still obtain high yields of the desired product. I have found, however, that by adjusting concentration of mineral acid in the entire reaction mixture so that it falls below 1.0 N and preferably between 0.06 N and 0.6 N; by conducting the reaction preferably at room temperature and in no event higher than 50° C.; and finally by employing an amount of water in the reaction medium so as to provide a molar ratio of the water to D-sorbitol of at least 2, and preferably between about 2 and about 3, excellent yields of a single isomeric form of monofurfurylidene sorbitol may be achieved.

In carrying out the process of my invention, the D-sorbitol may be employed in the form of substantially pure material, such as is readily available, or in the form of the commercial sorbitol syrup containing about 14% water. A mineral acid catalyst, e. g. nitric, phosphoric or, preferably sulfuric acid, and, if required, water are admixed with the sorbitol in such amounts as to provide a mixture having a molar ratio of water to sorbitol of at least 2, preferably between about 2 and about 3, and a final acid concentration, after addition of furfural, of less than 1.0 N, preferably between about 0.06 N and about 0.6 N; if the mixture is not homogeneous, it may be warmed until a clear syrup is obtained. Furfural is then added in an amount preferably equimolar to the D-sorbitol, although a slight excess may be used if desired. If desired, a mutual solvent for the furfural and sorbitol, such as methyl Cellosolve, may be added to homogenize the mixture. The mixture may then be agitated for a period of time which will vary depending upon the acid concentration, the higher the acid concentration, the shorter the time, but usually a time between 1 and 24 hours is sufficient. The desired monofurfurylidene sorbitol separates in substantially pure crystalline form; my investigations have indicated that the single isomeric form obtained is 2,4-monofurfurylidene sorbitol. The monofurfurylidene sorbitol may be further purified, if desired, by recrystallization from a suitable solvent such as water, but usually this step is not required as the product is sufficiently pure for direct oxidation or other processing.

Oxidation of the monofurfurylidene sorbitol to monofurfurylidene L-xylose and recovery of the L-xylose may be accomplished by treating a solution of monofurfurylidene sorbitol in a suitable solvent such as water, pyridine, methyl Cellosolve, dioxane or acetic acid with about the theoretical quantity of lead tetra acetate, either added as such or in a miscible solvent such as acetic acid. Room temperatures or higher may suitably be employed for this oxidation. Recovery of the L-xylose from the reaction mixture may be accomplished in any suitable manner. For example, if the reaction is carried out in an aqueous medium containing acetic acid in which the lead tetra acetate is added, it is simply necessary to remove lead as lead sulfide or lead sulfate and then heat the mixture, whereby the acetic acid present effects hydrolysis of the monofurfurylidene L-xylose. If a non-aqueous reaction medium is employed, the lead diacetate will be precipitated therefrom and may be recovered and the monofurfurylidene L-xylose may then be hydrolyzed by the addition of aqueous acid. Evaporation of the reaction mixture yields a product from which L-xylose may be crystallized in substantially pure condition and in excellent yields of from 80% to 90% of theoretical based on D-sorbitol.

The L-xylose may be utilized in any suitable manner for conversion to ascorbic acid. One method which has been found particularly suitable involves conversion of L-xylose to a mixture of L-idononitrile and L-gulononitrile followed by hydrolysis to form L-idonic acid and L-gulonic acid respectively; these acids may then be subjected to oxidation, isomerization and lactonization to form ascorbic acid.

The following examples are illustrative of my invention:

*Example 1*

191 g. of crystalline D-sorbitol (1 mole of D-sorbitol hemihydrate) and 52 cc. of 3 N sulfuric acid were introduced into a vessel and the mixture warmed until a clear syrup was obtained. The mixture was then cooled to room temperature and 95.7 g. of furfural added. The sulfuric acid concentration in the final reaction mixture was about 0.6 N and the molar ratio of water to sorbitol was about 2.75. The mixture was agitated at room temperature for an hour, becoming almost solid with crystals in 20 minutes. A quantity of strong aqua ammonia, just more than sufficient to neutralize the sulfuric acid, was then added. This required about 11.0 cc. After thorough mixing, the crystals of monofurfurylidene sorbitol were spun free from adhering liquid in a centrifuge and dried in a vacuum oven at 50° C. A small additional quantity of product was obtained by concentrating combined mother liquors from several batches.

The product after one or two recrystallizations from 85% ethanol or from water alone melted between 191° and 192° C. On analysis, this product gave 50.9% carbon and 6.49% hydrogen; calculated for monofurfurylidene sorbitol is 50.77% carbon and 6.15% hydrogen.

280 g. of the crude product produced as described in the first paragraph of this example were dissolved in 7500 cc. of water near the boiling point and a solution of 480 g. of lead tetra acetate in 3000 cc. of hot acetic acid was added with vigorous stirring. After five minutes of agitation, 2500 cc. of 1 N sulfuric acid was added and the mixture kept warm on a steam bath for 7 hours to precipitate lead as lead sulfate and simultaneously to hydrolyze the furfurylidene groups from the unisolated oxidation product, 2,4-monofurfurylidene-L-xylose.

Sulfate ions were then removed by precipitation as barium sulfate and lead and barium sulfates removed by filtration. On concentrating the filtrate to a small volume, white crystals of L-xylose separated. This product melted between 128° and 131° C. After one recrystallization from alcohol, the L-xylose so obtained melted between 137° and 137.5° C. and showed a specific rotation of 19.4° at equilibrium. (D line of sodium; concentration about 1%.) The total yield of L-xylose, based on sorbitol used, was 80% to 90% of the theoretical.

*Example 2*

In this example, the same procedure as described in Example 1 was employed, except that 52 cc. of 0.3 N sulfuric acid was added to the reaction mixture to produce an acid concentration in the reaction mixture of 0.06 N, and the reaction mixture was shaken for 24 hours. The monofurfurylidene sorbitol was then recovered and oxidized as described in Example 1.

Since certain changes may be made in the procedure of my invention without departing from the scope thereof, it is intended that the above description shall be interpreted as illustrative and not in a limiting sense.

I claim:

1. In the production of L-xylose from D-sorbitol, the improvements which comprise reacting D-sorbitol and furfural at a temperature not above 50° C. in the presence of an amount of mineral acid such that the concentration thereof in the entire reaction mixture is less than 1.0 N and in the presence of an amount of water such that the molar ratio of water to sorbitol is at least 2, whereby monofurfurylidene sorbitol is produced.

2. In the production of L-xylose from D-sorbitol, the improvements which comprise reacting D-sorbitol and furfural at a temperature not above 50° C. in the presence of an amount of mineral acid such that the concentration thereof in the entire reaction mixture is less than 1.0 N and in the presence of an amount of water such that the molar ratio of water to sorbitol is at least 2, whereby monofurfurylidene sorbitol is produced, oxidizing the monofurfurylidene sorbitol thus obtained to monofurfurylidene L-xylose and recovering L-xylose therefrom.

3. In the production of L-xylose from D-sorbitol, the improvements which comprise reacting D-sorbitol and furfural at a temperature not above 50° C. in the presence of an amount of mineral acid such that the concentration thereof in the entire reaction mixture is between about 0.06 N and about 0.6 N and in the presence of an amount of water such that the molar ratio of water to sorbitol is between about 2 and about 3, whereby monofurfurylidene sorbitol is produced, oxidizing the monofurfurylidene sorbitol to monofurfurylidene L-xylose and recovering L-xylose therefrom.

4. In the production of L-xylose from D-sorbitol, the improvements which comprise reacting D-sorbitol and furfural at room temperature in the presence of an amount of mineral acid such that the concentration thereof in the entire reaction mixture is between about 0.06 N and about 0.6 N and in the presence of an amount of water such that the molar ratio of water to sorbitol is between about 2 and about 3, whereby monofurfurylidene sorbitol is produced, oxidizing the monofurfurylidene sorbitol with lead tetra acetate to monofurfurylidene L-xylose and recovering L-xylose therefrom.

5. In the production of L-xylose from D-sorbitol, the improvements which comprise reacting D-sorbitol and furfural at room temperature in the presence of an amount of sulfuric acid such that the concentration thereof in the entire reaction mixture is between about 0.06 N and about 0.6 N and in the presence of an amount of water such that the molar ratio of water to sorbitol is between about 2 and about 3, whereby monofurfurylidene sorbitol is produced, oxidizing the monofurfurylidene sorbitol with lead tetra acetate to monofurfurylidene L-xylose and recovering L-xylose therefrom.

ROBERT C. HOCKETT.

REFERENCES CITED

The following references are of record in the file of this patent:

FOREIGN PATENTS

| Number | Country | Date |
|---|---|---|
| 627,249 | Germany | Dec. 6, 1933 |

OTHER REFERENCES

Bredereck et al.: Ber. 70 (1937), pp. 797–802, 6 pages.

Van der Laan et al.: Rec. Trav. Chim., 62 (1943), pp. 824–826, 3 pages.

Pigman: "Carbohydrate Chemistry," 1948, p. 225, 1 page.